United States Patent
Watanabe et al.

(10) Patent No.: US 6,325,748 B1
(45) Date of Patent: Dec. 4, 2001

(54) TOOL TRANSFER DEVICE FOR MACHINE TOOLS

(75) Inventors: Michio Watanabe; Masateru Nakai; Tatsuya Yamamoto, all of Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/644,704

(22) Filed: Aug. 24, 2000

(30) Foreign Application Priority Data

Aug. 27, 1999 (JP) .................................................. 11-240840

(51) Int. Cl.$^7$ .................................................. B23Q 3/156
(52) U.S. Cl. .................................. 483/1; 483/41; 483/51; 483/53; 483/62
(58) Field of Search .................................... 483/1, 51, 58, 483/61, 62, 53, 60, 37, 46, 41, 42, 40, 44

(56) References Cited

U.S. PATENT DOCUMENTS

| | | | |
|---|---|---|---|
| 3,161,951 | * 12/1964 | Anthony | 483/53 X |
| 3,780,423 | * 12/1973 | Lilienthal et al. | 483/52 |
| 3,820,234 | * 6/1974 | Poincenot | 483/46 |
| 3,822,466 | * 7/1974 | Noguchi et al. | 483/53 X |
| 4,196,506 | * 4/1980 | Reed | 483/41 |
| 4,670,965 | * 6/1987 | Sato | 483/46 |
| 4,773,152 | * 9/1988 | Kitamura | 483/53 X |
| 4,890,969 | * 1/1990 | Esser | 483/53 X |
| 5,797,825 | * 8/1998 | Murata et al. | 483/51 X |

FOREIGN PATENT DOCUMENTS

| | | | |
|---|---|---|---|
| 136471 | * 7/1979 | (DE) | 483/53 |
| 118822 | * 6/1980 | (EP) | 483/53 |
| 56-39849 | * 4/1981 | (JP) | 483/53 |
| 61-50739 | * 3/1986 | (JP) | 483/53 |
| 61-226241 | * 10/1986 | (JP) | 483/53 |
| 62-236643 | * 10/1987 | (JP) | 483/53 |

* cited by examiner

*Primary Examiner*—William Briggs
(74) *Attorney, Agent, or Firm*—Smith Patent Office

(57) ABSTRACT

A tool transfer device for machine tools that can reduce the tool transfer time and also reduce the cost of the device by eliminating the need for a driving source. The tool transfer device for machine tools has a tool magazine set beside a spindle on which a tool is mounted. The tool magazine serves for accommodating and holding therein a multiplicity of tools so that the tools are directed perpendicular to an axis of the spindle. A transfer pot is set on a spindle side of the tool magazine and is driven and moved by a horizontal moving unit and a vertical moving unit. This allows a next-process tool accommodated in the tool magazine to be taken out and transferred horizontally to a stroke end position by the transfer pot, and the next-process tool is then tilted at the stroke end position to a tool changing position in which the next-process tool is parallel to the axis of the spindle. The tool transfer device comprises a tool tilting mechanism including a tilted cam member and a tilting cam member for tilting the next-process tool to the tool changing position by horizontal movement of the horizontal moving unit to the stroke end position. The method of operating the tool transfer device is also presented.

10 Claims, 9 Drawing Sheets

TOOL TRANSFER DEVICE FOR MACHINE TOOLS

BACKGROUND OF THE INVENTION

1. Field of the Invention

The present invention relates to a tool transfer device for machine tools designed to transfer a next-process tool that is taken out from a tool magazine, where a multiplicity of tools are accommodated and held, to a tool changing position by a transfer pot.

2. Discussion of the Related Art

In some machine tools equipped with a tool changer, in order to enable production of a variety of product types with continuous automatic operation, a rack type tool magazine for accommodating and holding therein a multiplicity of tools is disposed on one side of the machine body with the tools directed perpendicular to the axis of the spindle, while a tool transfer device is mounted for transferring a next-process tool from the tool magazine to a tool changing position where the tool is positioned parallel to the axis of the spindle.

One such a tool transfer device has generally been provided having the following structure. That is, a transfer pot that is driven by a horizontal moving unit and a vertical moving unit is disposed on the spindle side of the tool magazine. A next-process tool accommodated in the tool magazine is taken out and moved horizontally by the transfer pot, thereby it is transferred up to a stroke end position. At the stroke end position, the next-process tool is moved over by being pulled out from the transfer pot and inserted into a tilting standby pot. The tilting standby pot is tilted by a tilting device such as a cylinder mechanism so that the next-process tool is positioned to a tool changing position where the tool is parallel to the axis of the spindle. Then, the next-process tool in this tool changing position and a process-completed tool in the spindle are automatically exchanged by the tool changer.

However, in this conventional tool transfer device where the next-process tool is tilted to the tool changing position by the tilting device after being moved over from the transfer pot into the tilting standby pot, there are problems that a loss of tool transfer time is involved. Further the cost of the device increases due to the additional requirement for a driving source for the tilting operation.

SUMMARY OF THE INVENTION

The present invention has been obtained by considering these and other problems of the prior art. An object of the invention is to provide a tool transfer device for machine tools capable of reducing the tool transfer time and also reducing the cost of the apparatus by eliminating the need for any additional driving source for the tools.

In order to achieve the above object, the present invention provides a tool transfer device for machine tools, comprising a tool magazine disposed adjacent to a spindle having a tool mounted thereon. The tool magazine serves to accommodate and hold therein a multiplicity of tools so that the tools are held so that their longitudinal axes are directed perpendicular to a longitudinal axis of the spindle. A transfer pot is set on a spindle side of the tool magazine and the transfer pot is driven and moved by a horizontal moving unit and a vertical moving unit. The next-process tool accommodated in the tool magazine can be removed from the tool magazine and transferred horizontally to a stroke end position by the transfer pot. The next-process tool is tilted at the stroke end position to a tool changing position where the longitudinal axis of the next-process tool is parallel to the longitudinal axis of the spindle. The tool transfer device comprises a tool tilting mechanism constructed and arranged for tilting the next-process tool to the tool changing position by horizontal movement of the horizontal moving unit to the stroke end position.

In one embodiment, there is provided a tool transfer device for machine tools as described above, wherein the tool tilting mechanism comprises a tilted cam member set on the transfer pot, and a tilting cam member fixedly set near the stroke end position and serving for tilting the transfer pot so that the next-process tool is positioned to the tool changing position, while making sliding contact with the tilted cam member by horizontal movement of the transfer pot.

In another embodiment, a tool transfer device for machine tools as described above is provided, wherein the tool tilting mechanism comprises a link mechanism for swingably coupling the vertical moving unit with the horizontal moving unit, and guide rails for tilting the vertical moving unit by horizontal movement of the horizontal moving unit so that the next-process tool is positioned in the tool changing position.

In another embodiment, a tool transfer device for machine tools as described above is provided, wherein the transfer pot comprises an upper portion and a lower portion that are vertically movable relative to each other. The tool is gripped by vertical movement of the upper portion and the lower portion.

In another embodiment, a tool transfer device for machine tools as described above is provided, wherein the tool magazine comprises a vertical path and a horizontal path for transferring tools. The horizontal path is provided near the vertical center of the tool magazine.

In the tool transfer device according to the present invention, since the tool tilting mechanism for tilting the next-process tool to the tool changing position by horizontal movement of the horizontal moving unit to the stroke end position is provided, the next-process tool can be tilted by making use of the driving force of the horizontal moving unit that transfers the next-process tool up to the stroke end position. Thus, the need for a conventional driving source such as a cylinder mechanism can be eliminated, producing an advantage that a parts count can be reduced and a cost reduction can be achieved.

Also, since the next-process tool is tilted directly from the perpendicular-to-spindle position to the parallel-to-spindle position with the driving force of the horizontal moving unit, there is the advantage that the tool transfer time can be shortened when compared to the conventional case where the next-process tool is moved over from the transfer pot to the tilting standby pot. This feature contributes to an increase in the tool changing time.

In another embodiment, the tilted cam member is disposed on the transfer pot. The tilting cam member which, while keeping sliding contact with the tilted cam member, tilts transfer pot to the tool changing position disposed near the stroke end position. Therefore, there is an advantage that the tool tilting mechanism can be fulfilled by a simple structure without using any driving source and it can be achieved and implemented with low cost.

In another embodiment, the vertical moving unit is swingably coupled to the horizontal moving unit via the link mechanism. Further, guide rails are provided for tilting the next-process tool to the tool changing position as a whole of the vertical moving unit by horizontal movement of the horizontal moving unit. Therefore, there a further advantage can be achieved in that the tool tilting mechanism can be fulfilled using a simple structure without using any driving sources and thus it can be implemented with a low cost.

In another aspect of the invention, since the transfer pot is composed of an upper portion and a lower portion and since the tool is gripped by vertical movement of the upper portion and the lower portion, an additional advantage can be achieved. Specifically, the need for axial movement of the tool in taking out the tool from the tool magazine can be eliminated so a space savings relative to this unnecessary structure can be obtained.

In another aspect of the invention, since the horizontal path is provided near the vertical center of the tool magazine, an advantage can be obtained by shortening the tool transfer distance, compared with the conventional case where the tool is retreated to the upper end position of the tool magazine and then it is horizontally moved from this upper-end retreat position.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
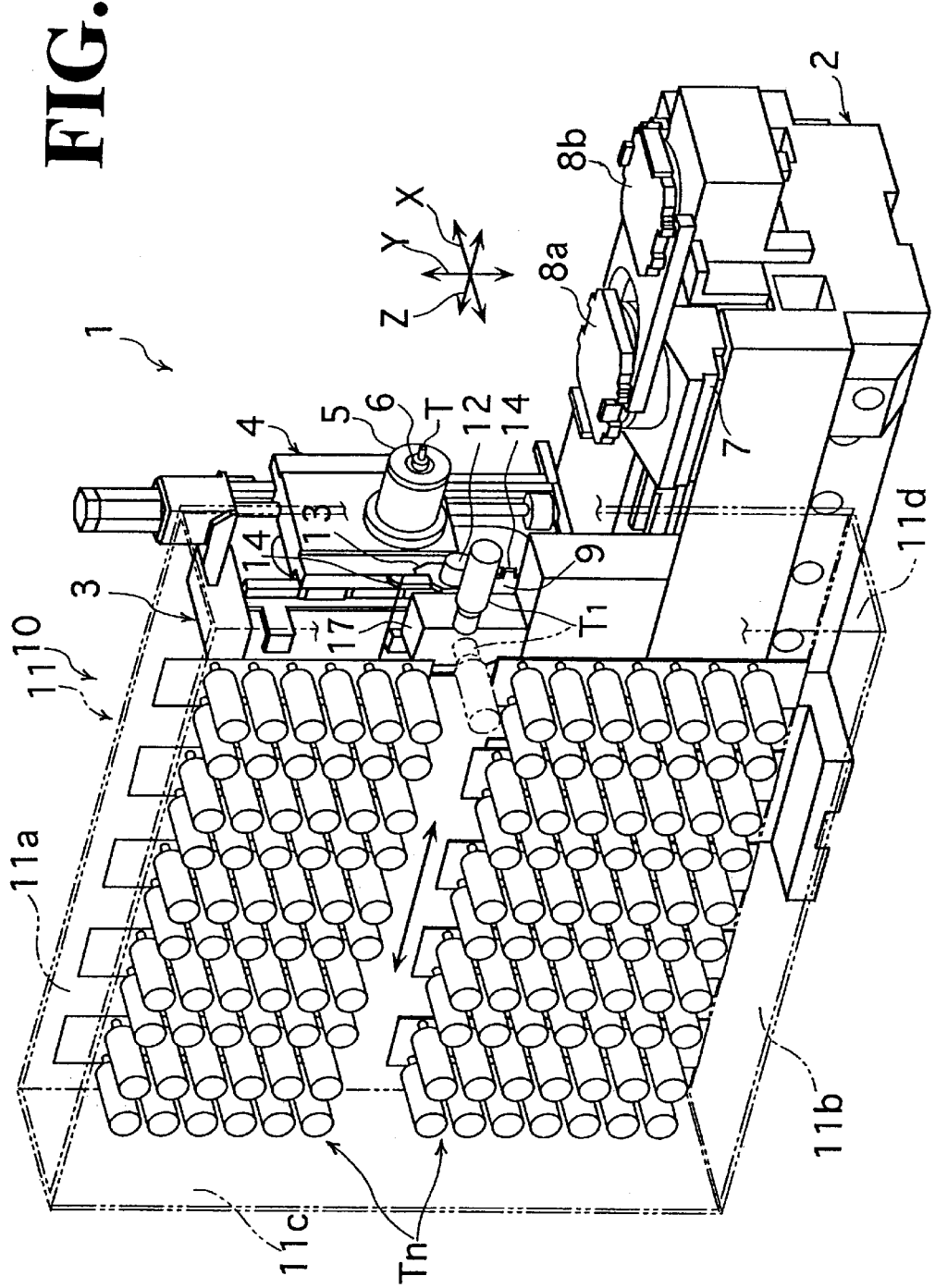
FIG. 1 is a perspective view of a horizontal type machining center equipped with a tool magazine according to a first embodiment of the present invention.
Figure 2:
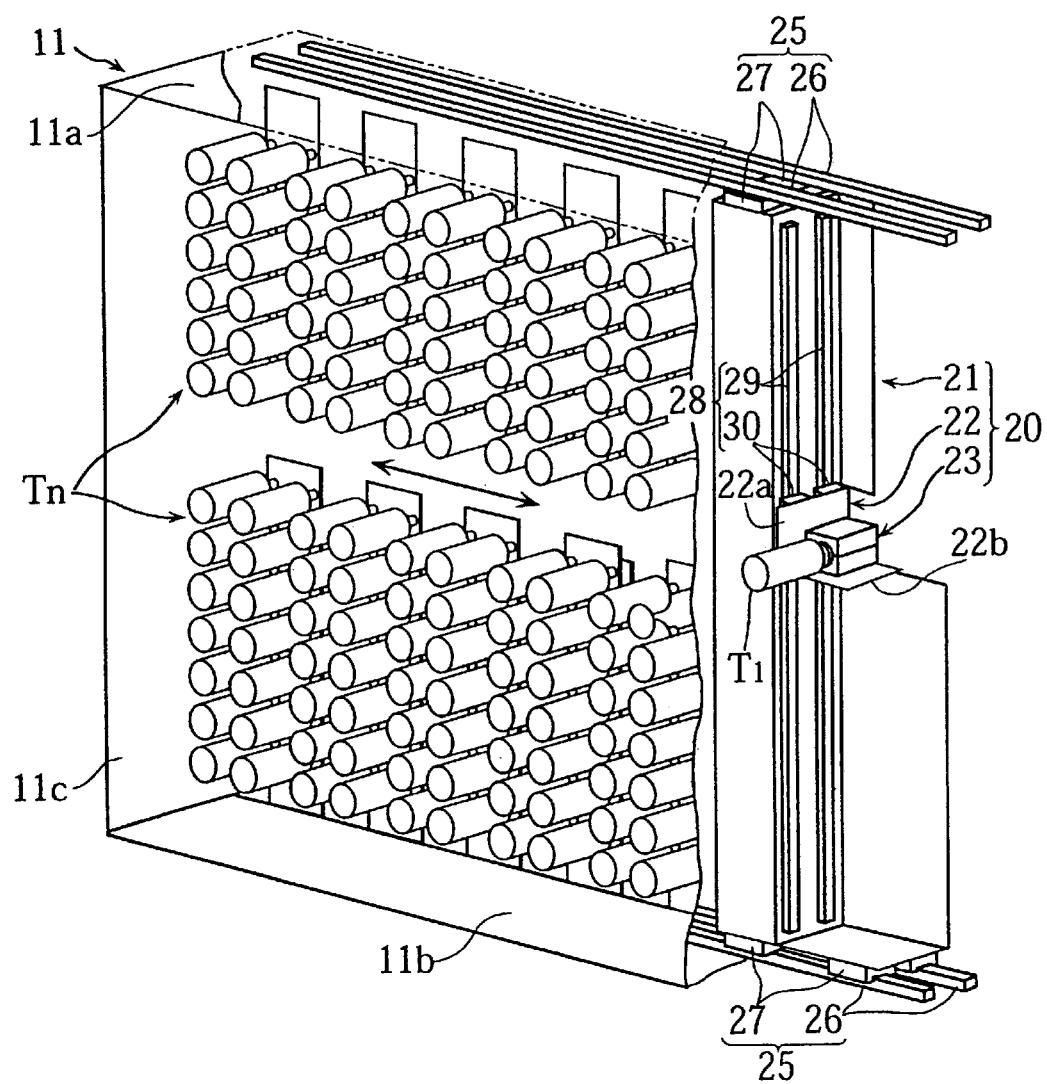
FIG. 2 is a schematic perspective view of the tool transfer device and the tool magazine.
Figure 3A:
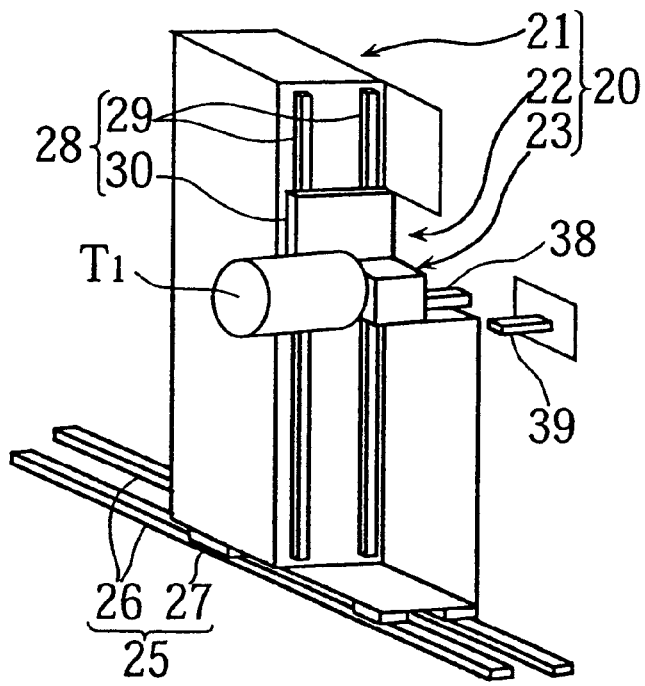
FIGS. 3A and 3B are schematic views showing a tilting or rotating operation of the tool transfer device.
Figure 3B:
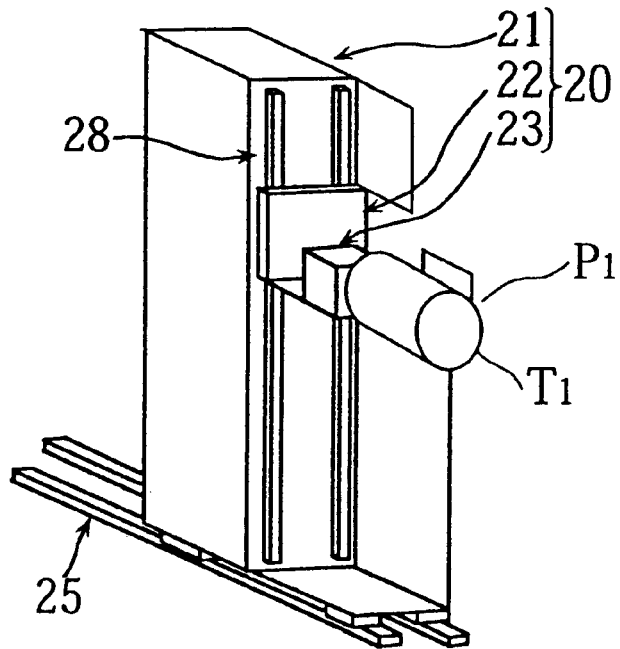

FIGS. 1 through 7 are views for explaining the tool transfer device for a machine tool according to a first embodiment of the invention.

In the figures, reference numeral 1 denotes a horizontal type machining center (machine tool). In this horizontal type machining center 1, roughly referring to its construction, a rectangular cylindrical-shaped column 3 is set in the rear of a fixed bed 2 so as to be movable in an X-axis direction (right-and-left direction as viewed from the front). A saddle 4 is set in the front of the column 3 so as to be movable in a Y-axis direction (up-and-down direction), and a spindle head 5 is set on the saddle 4.

A spindle 6 is rotatably inserted in the spindle head 5, and a tool T is mounted on the spindle 6. A machining table 7 is set in the forward portion of the fixed bed 2 so as to be movable in a Z-axis direction (back-and-forth direction). Two pallets 8a, 8b are set on the machining table 7 so as to be pivotable between a machining position and a standby position. In this horizontal type machining center 1, the spindle 6, while being driven in a rotational manner, is moved in the X-axis and Y-axis directions. Moreover the machining table 7 is moved in the Z-axis direction so as to allow a workpiece placed on the pallet 8a positioned in the machining position to be machined. During this machining process, a next-process workpiece is set to the pallet 8b positioned in the standby position.

Figure 4:
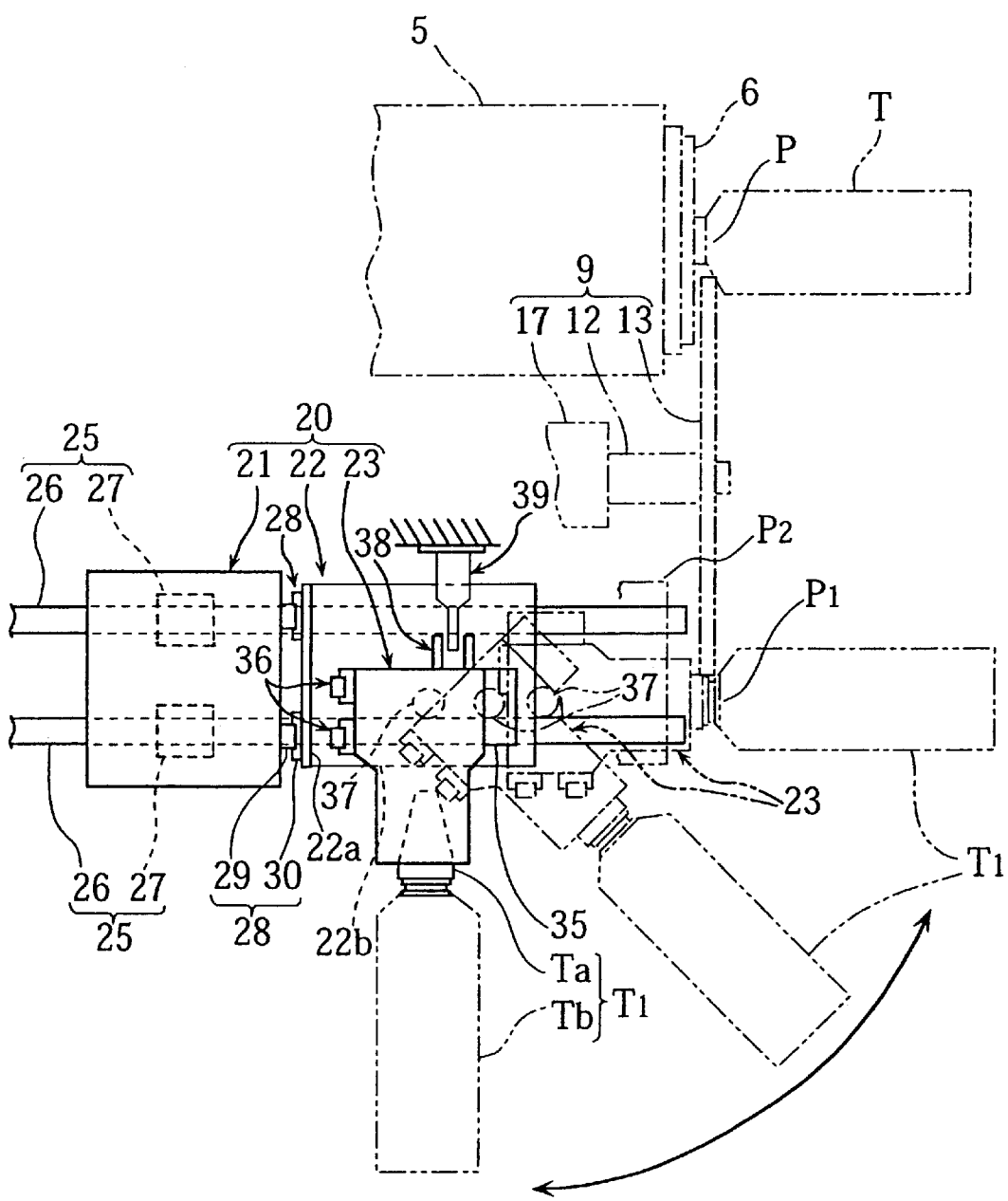
FIG. 4 is a schematic plan view showing the tilting or rotating operation of the tool transfer device.

A tool changer 9 is set on one side of the column 3. This tool changer 9 is so structured that, as shown in FIGS. 1 and 4, a changing shaft 12 is axially movably and rotatably held by a change driver 17 fitted to the column 3 and that a changing arm 13 is fixed at a forward end portion of the changing shaft 12. Tool gripper portions 14 are provided at both end portions of the changing arm 13.

The tool changer 9 automatically replaces a process-completed tool T positioned in a spindle-side tool changing position P with a next-process tool T1 positioned in a magazine-side tool changing position P1. More concretely, the changing shaft 12 rotates, and the gripper portions 14 of the changing arm 13 grip the process-completed tool T and the next-process tool T1. In this state, the changing shaft 12 advances, pulling the process-completed tool T out of the spindle 6 and pulling the next-process tool T1 out of a later-described transfer pot 23, and subsequently the changing arm 13 rotates 180 degrees, retreating. Then, the next-process tool T1 is gripped by the spindle 6 while the process-completed tool T is gripped by the transfer pot 23, and the process-completed tool T is returned to a later-described tool magazine 10 by the transfer pot 23.

Beside the tool changer 9 attached to the fixed bed 2, is provided a rack type tool magazine 10. This tool magazine 10 has a multiplicity (e.g., 120) of tools Tn accommodated and held in its rack body 11. The rack body 11 is generally box-shaped and has a rectangular frame body formed from a top wall 11a and a floor wall 11b coupled together by means of front and rear walls 11d, 11c, where in the rack body 11, the tools Tn are arranged in parallel toward a direction (X-axis direction) perpendicular to the axis of the spindle 6 (Z-axis direction). Also, although not shown, between the tools Tn within the rack body 11, a vertical path for taking tools in and out is provided. A horizontal path for transferring tools to the tool changing position P1 is also provided. The horizontal path is provided at the vertical center of the rack body 11.

Each of the tools Tn has a cutting tool Tb such as a drill or an end mill fitted into a conical tool holder Ta. Each tool Tn is so set that the cutting tool Tb is positioned outside the machine while the tool holder Ta is positioned inside the machine (on the spindle side).

A tool transfer device 20 is set on the inner side of the tool magazine 10. This tool transfer device 20 is made up of a quadratic-prism-shaped horizontal moving unit 21 which moves horizontally along the axis of the spindle 6 (Z-axis direction), a vertical moving unit 22 being set to contact the horizontal moving unit 21 so as to be movable in the up-and-down direction (Y-axis direction), and the transfer pot 23 is fixedly set to the vertical moving unit 22. Horizontal and vertical drivers are provided for the horizontal moving unit 21 and the vertical moving unit 22, respectively.

The horizontal moving unit 21 is held to the top wall 11a and floor wall 11b of the rack body 11 so as to be movable via linear rails 25. These linear rails 25 are so constructed that blocks 27 fixed to the horizontal moving unit 21 are slidably engaged with two rails 26 laid down on the top wall 11a and the floor wall 11b with guide rollers (not shown) respectively interposed therebetween.

The vertical moving unit 22 is made up of a longitudinal plate portion 22a confronting the front wall of the horizontal moving unit 21, and a horizontal plate portion 22b, where the horizontal plate portion 22b has the transfer pot 23 mounted thereon. The vertical moving unit 22 is held on the front wall of the horizontal moving unit 21 so as to be movable via linear rails 28, and the linear rails 28 are so constructed that blocks 30 fixed to the longitudinal plate portion 22a are slidably engaged with two rails 29 laid down on the front wall of the horizontal moving unit 21 with guide rollers interposed therebetween, respectively, like the foregoing case.

Figure 7:
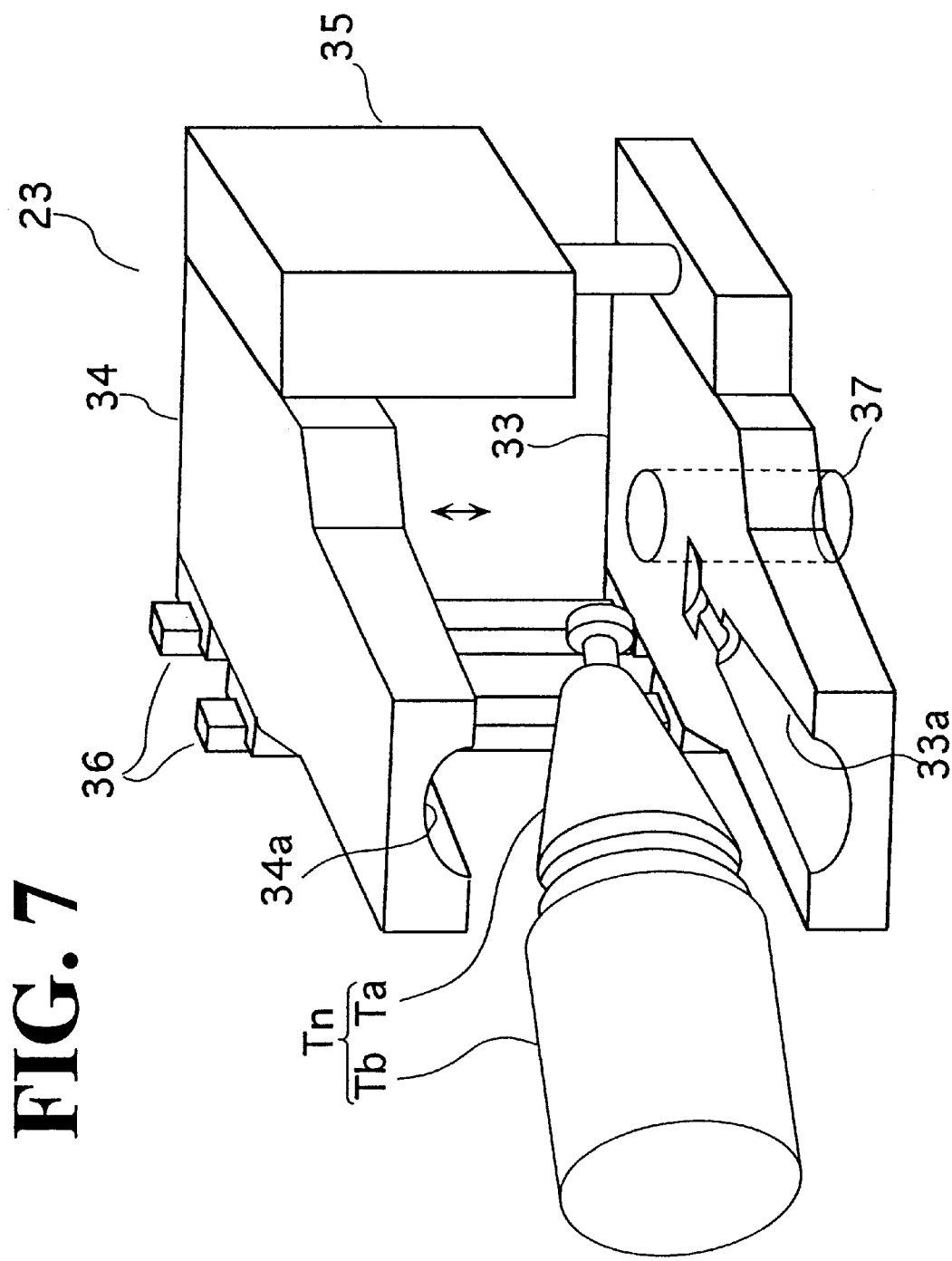
FIG. 7 is a perspective view of the transfer pot of the tool transfer device.

The transfer pot 23 is so constructed that, as shown in FIG. 7, a lower portion 33 and an upper portion 34 are vertically movably held by two guide members 36 and they are vertically driven by a cylinder mechanism 35. The lower portion 33 and the upper portion 34 have recessed portions formed therein so as to provide holder recesses 33a, 34a, respectively, at which the tool holder Ta is to be accommodated and gripped. The tool gripper portions of the transfer pot 23 project outwardly from the outer-side end faces of the moving units 21, 22 so that tools can be taken out from the tool magazine 10 without axially moving the tools.

Also, a tilting shaft 37 is fixedly inserted in the lower portion 33, and the tilting shaft 37 is held to the horizontal plate portion 22b so as to be pivotable between a perpendicular-to-spindle position and a parallel-to-spindle position. This tilting shaft 37 is pivotally biased to the perpendicular-to-spindle position by an unshown biasing mechanism.

Figure 5:
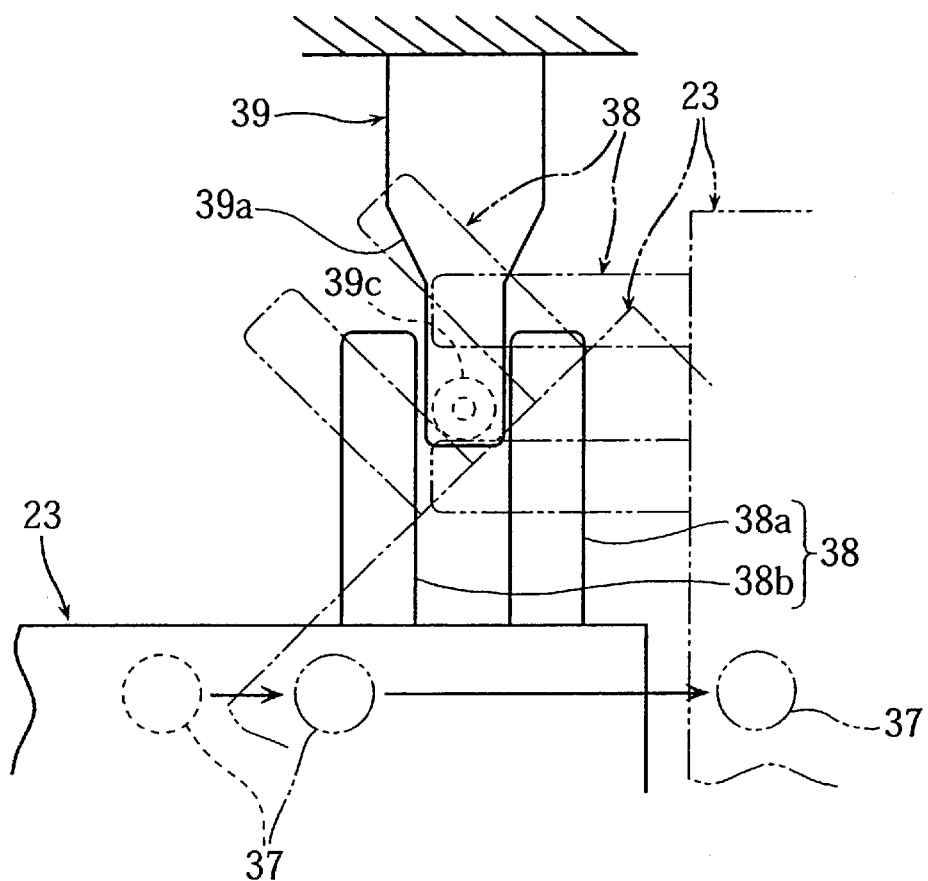
FIG. 5 is a schematic plan view showing an operation of a tool tilting mechanism of the tool transfer device.
Figure 6:
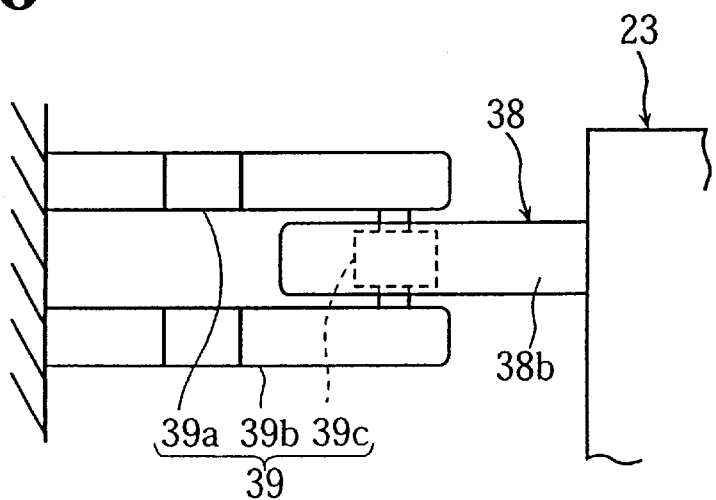
FIG. 6 is a schematic rear view of the tool tilting mechanism.

Then, as shown in FIGS. 4 to 6, the transfer pot 23 is provided with a tilted cam member 38 constituting one of the tool tilting mechanisms. The tilted cam member 38 is fixedly mounted on the inner side wall of the transfer pot 23. Also, a tilting cam member 39 comprising another of the tool tilting mechanisms is set at a site confronting the tilted cam member 38 a little short of the stroke end position P2. The tilting cam member 39 is fixedly mounted on the machine-body side.

The tilting cam member 39 is so structured that a cam follower 39c is rotatably held between a pair of upper-and-lower holder plates 39a, 39b. The tilted cam member 38 is composed of a pair of front-and-rear cam plates 38a, 38b, and the cam follower 39c is engageable between the cam plates 38a, 38b.

As viewed along the back-and-forth direction, the tilted cam member 38 is located a little upper or lower than the tilting cam member 39, so that as the tilted cam member 38 is horizontally moved by the horizontal moving unit 21 to a position confronting the cam follower 39c, the vertical moving unit 22 moves the front-and-rear cam plates 38a, 38b downward or upward until the cam plates 38a, 38b are engaged with the cam follower 39c. Then, in this state, while the horizontal moving unit 21 moves to the stroke end position P2, the inner side face of the rear cam plate 38b makes sliding contact with the cam follower 39c and the transfer pot 23 pivots 90 degrees about the tilting shaft 37, thus tilting to the tool changing position P1 parallel to the axis of the spindle. Also, as the horizontal moving unit 21 moves backward from the stroke end position P2, the front cam plate 38a makes sliding contact with the cam follower 39c, thereby returning the transfer pot 23 to the perpendicular-to-spindle position.

Next, some of the functional effects of this embodiment are described.

In this tool transfer device 20, the horizontal moving unit 21 and the vertical moving unit 22 transfer the transfer pot 23 to the takeout position for the next-process tool T1. The transfer pot 23 takes out the next-process tool T1 from the rack body 11, and the next-process tool T1 is transferred to the horizontal path via the vertical path by the units 21, 22. From this point on, the horizontal moving unit 21 linearly transfers the next-process tool T1 horizontally to the stroke end position P2 (see arrows in FIGS. 1 and 2).

When the transfer pot 23 is linearly moved horizontally by the horizontal moving unit 21 so as to be brought to the position confronting the cam follower 39c of the tilting cam member 39, the vertical moving unit 22 moves vertically so that the front-and-rear cam plates 38a, 38b are engaged with the cam follower 39c. In this state, simultaneously with when the transfer pot 23, moving horizontally, reaches the stroke end position P2, the transfer pot 23 pivots 90 degrees. As a result, the next-process tool T1 is located in the tool changing position P1 where the tool is parallel to the axis of the spindle 6. Then, the next-process tool T1 located at the magazine-side tool changing position P1 and the process-completed tool T located at the spindle-side tool changing position P are automatically exchanged by the above-described tool changer 9.

As shown above, according to this embodiment, the tilted cam member 38 is fixed to the inner side wall of the transfer pot 23, and the tilting cam member 39 is fixed on the machine-body side before the stroke end position P2. Then, while the tilted cam member 38 is engaged with the tilting cam member 39 by horizontal movement of the horizontal moving unit 21 as well as vertical movement of the vertical moving unit 22, the transfer pot 23 is pivoted 90 degrees so that the next-process tool T1 is located at the tool changing position P1. Therefore, by making use of the thrust of the horizontal moving unit 21 that transfers the next-process tool T1 up to the stroke end position P2, the next-process tool T1 can be tilted to the tool changing position P1, so that the need for the conventional driving source can be eliminated, allowing a parts count cut and a cost reduction to be achieved.

Also, since the next-process tool T1 is pivoted from the perpendicular-to-spindle position to the parallel-to-spindle position with the thrust of the horizontal moving unit 21, tool transfer times can be shortened when compared with the conventional case where the next-process tool is once moved over from the transfer pot to the tilting standby pot. This further contributes to increasing the tool changing time.

In this embodiment, the tilted cam member 38 is fixed to the transfer pot 23, and the tilting cam member 39 which is to be engaged with the tilted cam member 38 to make the transfer pot 23 pivoted is fixedly set before the stroke end position P2. Therefore, the tool tilting mechanism can be fulfilled in a simple structure without using any additional driving source.

Also, the lower portion 33 and the upper portion 34 of the transfer pot 23 are moved vertically by the cylinder mechanism 35, by which the tool holder Ta is gripped. Therefore, the need for axial movement in taking out the next-process tool T1 from the tool magazine 10 can be eliminated, allowing additional space savings to be realized.

Further, since the horizontal path is provided near the vertical center of the tool magazine 10, the tool transfer distance can be shortened, when compared with the conventional case where the tool is retreated to an upper end position of the tool magazine and then it is horizontally moved from this upper-end retreat position.

Figure 8:
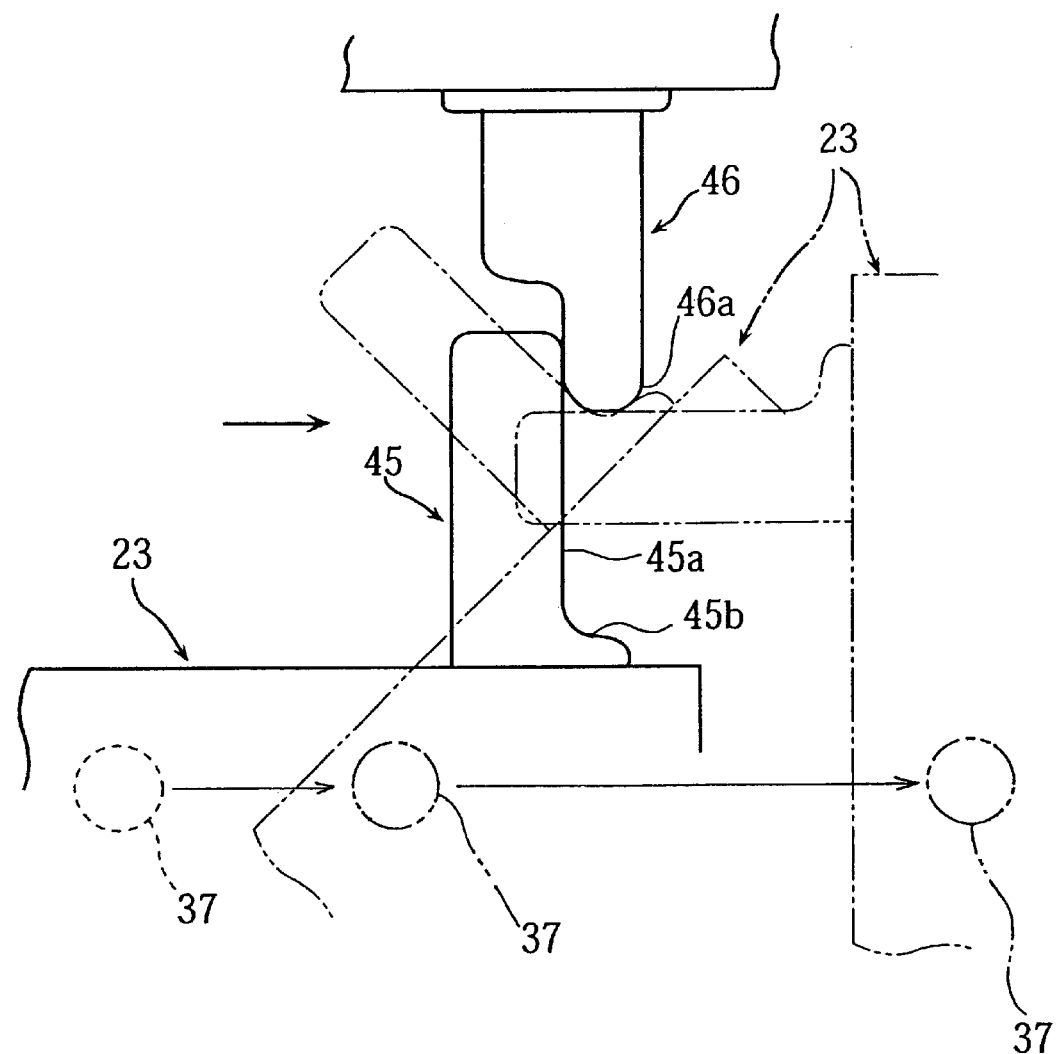
FIG. 8 is a schematic plan view showing an operation of tool tilting mechanism according to a second embodiment of the invention.

FIG. 8 is a view for explaining tool tilting mechanisms according to a second embodiment of the invention. In this figure, the same reference numerals as in FIG. 5 denote the same or corresponding component members.

The tool tilting mechanism of this embodiment is made up of a tilted cam member 45 fixed to the inner side wall of the transfer pot 23, and a tilting cam member 46 fixed to the machine body side. A semicircular tilting cam surface 46a is formed at a forward end portion of the tilting cam member 46. A linear-shaped linear cam surface 45a makes sliding contact with the tilting cam surface 46a as well as an approximately circular cam surface 45b which is curved in continuation from the linear cam surface 45a.

Then, when the tilted cam member 45 is horizontally moved by the horizontal moving unit 21 so as to come into contact with the tilting cam member 46, the linear cam surface 45a makes sliding contact with the tilting cam surface 46a. The transfer pot 23 pivots 90 degrees so as to be tilted to the tool changing position P1 in which the transfer pot 23 is parallel to the axis of the spindle. Also, as the horizontal moving unit 21 moves backward from the stroke end position P2, the circular cam surface 45b makes sliding contact with the tilting cam surface 46a while the linear cam surface 45a maintains sliding contact with the tilting cam surface 46a, by which the transfer pot 23 is returned to the perpendicular-to-spindle position.

According to this embodiment, the tilted cam member 45 is fixed to the machine inner side wall of the transfer pot 23, and the tilting cam member 46 is fixed to the machine body at a site short of the stroke end position P2. Then, while the tilted cam member 45 is engaged with the tilting cam member 46 by horizontal linear movement of the horizontal moving unit 21, the transfer pot 23 is pivoted 90 degrees so that the next-process tool T1 is located at the tool changing position P1. Therefore, the next-process tool T1 can be tilted to the tool changing position P1 by making use of the thrust of the horizontal moving unit 21, thus eliminating the need for the conventional driving source, so that the same effects as in the first embodiment can be obtained. Further, in this embodiment, the transfer pot 23 can be tilted only by horizontal movement of the horizontal moving unit 21.

Figure 9A:
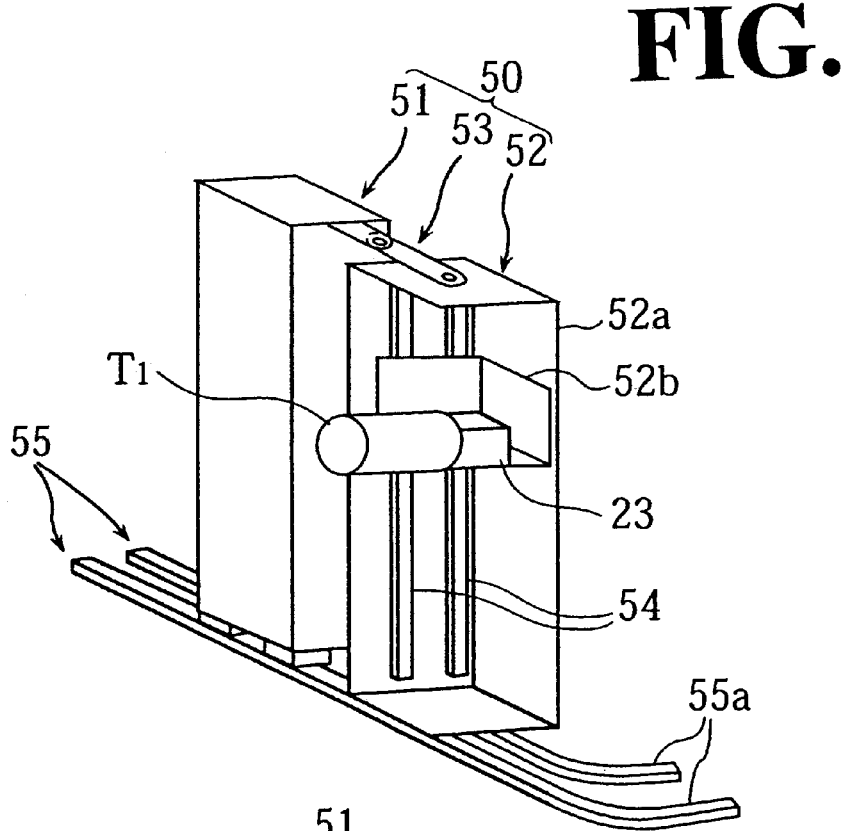
FIGS. 9A and 9B are schematic views showing a tool tilting mechanism according to a third embodiment of the invention.
Figure 9B:
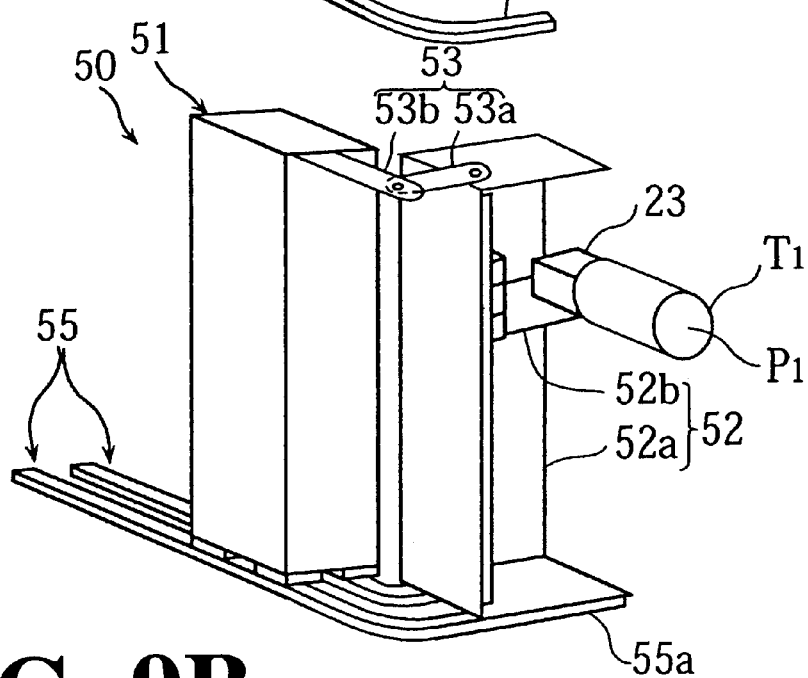
Figure 10:
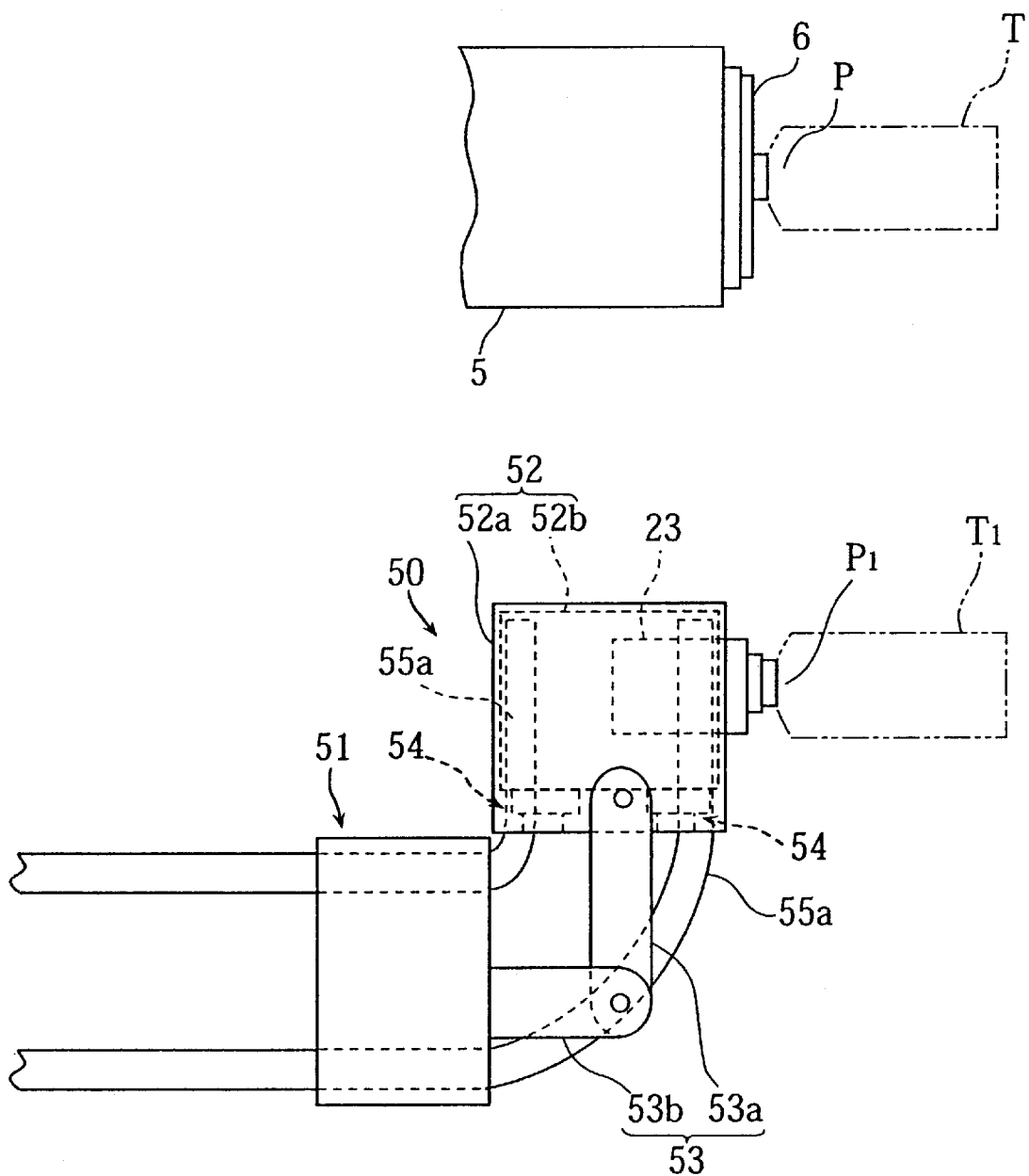
FIG. 10 is a schematic plan view showing an operation of the tool tilting mechanism.

FIGS. 9 and 10 are views for explaining a tool tilting mechanism according to a third embodiment of the invention. In these figures, the same reference numerals as in FIGS. 3 and 4 denote the same or corresponding component members.

A tool transfer device 50 of this embodiment is so constituted that a quadratic-prism-shaped horizontal moving unit 51 and a vertical moving unit 52 are formed independently of each other. The vertical moving unit 52 is swingably coupled with the horizontal moving unit 51 via a link mechanism 53. The horizontal moving unit 51 is horizontally movably held to the rack body (not shown) via two linear rails 55.

In the vertical moving unit 52, a vertical moving member 52b is disposed within a generally box-shaped unit body 52a so as to be vertically movable via two linear rails 54, and a transfer pot 23 is fixedly disposed on the vertical moving member 52b.

Also, in the link mechanism 53, a first link member 53a pivotally held on the unit body 52a, and a second link member 53b fixed to the horizontal moving unit 51 are pivotably coupled with each other.

Guide rails 55a bending inward are integrally formed at the stroke end portions of the linear rails 55 so as to be connected thereto. The unit body 52a is in sliding contact with and along the linear rails 55 and the guide rails 55a. As a result, simultaneous with when the horizontal moving unit 51, moving horizontally, reaches the stroke end position P2, the whole vertical moving unit 52 pivots 90 degrees along the guide rails 55a, and as a result, the next-process tool T1 is tilted or rotated to the tool changing position P1 in which the next-process tool T1 is parallel to the axis of the spindle 6.

In this tool transfer device 50 of this embodiment, the vertical moving unit 52 is swingably coupled with the horizontal moving unit 51 via the link mechanism 53, and the guide rails 55a are provided in order that the whole vertical moving unit 52 is tilted by horizontal movement of the horizontal moving unit 51 so that the next-process tool T1 is located at the tool changing position P1. Therefore, the next-process tool T1 can be tilted to the tool changing position P1 by making use of the thrust of the horizontal moving unit 51, thus allowing a reduction in the parts count and a cost reduction to be achieved. This also allows the transfer time to be shortened, contributing to a speedup in the transfer work. Thus, approximately the same effects as in the first embodiment can be obtained.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A tool transfer device for machine tools, comprising:
   a tool magazine disposed adjacent to a spindle having a tool mounted thereon, said tool magazine serving to accommodate and hold therein a multiplicity of tools so that the tools are held so that their longitudinal axes are directed perpendicular to a longitudinal axis of the spindle,
   a transfer pot set on a spindle side of the tool magazine, said transfer pot being driven and moved by a horizontal moving unit and a vertical moving unit, wherein a next-process tool accommodated in the tool magazine can be removed from the tool magazine and transferred horizontally to a stroke end position by the transfer pot, and the transfer pot and the next-process tool being tilted at the stroke end position to a tool changing position where the longitudinal axis of the next-process tool is parallel to the longitudinal axis of the spindle,
   the tool transfer device comprising a tool tilting mechanism constructed and arranged for tilting the transfer pot and the next-process tool to the tool changing position by horizontal movement of the horizontal moving unit to the stroke end position.

2. The tool transfer device for machine tools according to claim 1, wherein the tool tilting mechanism comprises a tilted cam member connected to the transfer pot, and a tilting cam member fixedly disposed near the stroke end position and being constructed and arranged for, while making sliding contact with the tilted cam member by horizontal movement of the transfer pot, tilting the transfer pot so that the next-process tool is positioned in the tool changing position.

3. The tool transfer device for machine tools according to claim 1, wherein the tool tilting mechanism comprises a link mechanism for swingably coupling the vertical moving unit with the horizontal moving unit, and guide rails disposed for tilting the vertical moving unit by horizontal movement of the horizontal moving unit so that the next-process tool is positioned in the tool changing position.

4. The tool transfer device for machine tools according to claim 1, wherein the transfer pot comprises an upper portion and a lower portion which are vertically movable relative to each other, and wherein the tool is gripped by the upper portion and the lower portion.

5. The tool transfer device for machine tools according to claim 1, wherein the tool magazine comprises a vertical path and a horizontal path for transferring tools, the horizontal path being provided near a vertical center of the tool magazine.

6. A method for operating a tool transfer device for machine tools, comprising the steps of:

providing a tool magazine adjacent to a spindle having a tool mounted thereon, arranging the tool magazine to accommodate and hold therein a multiplicity of tools so that the tools are held so that their longitudinal axes are directed perpendicular to a longitudinal axis of the spindle, providing a transfer pot on a spindle side of the tool magazine, driving the transfer pot by moving a horizontal moving unit and a vertical moving unit so that a next-process tool accommodated in the tool magazine can be withdrawn from the tool magazine and transferring the next-process tool horizontally to a stroke end position by the transfer pot, tilting the transfer pot and the next-process tool at the stroke end position to a tool changing position where the longitudinal axis of the next-process tool is parallel to the longitudinal axis of the spindle, and providing the tool transfer device with a tool tilting mechanism for tilting the next-process tool to the tool changing position by horizontal movement of the horizontal moving unit to the stroke end position.

7. The method of operating the tool transfer device for machine tools according to claim 6, further comprising providing the tool tilting mechanism with a tilted cam member connected to the transfer pot, and a tilting cam member fixedly disposed near the stroke end position and making sliding contact with the tilted cam member by horizontal movement of the transfer pot, and tilting the transfer pot so that the next-process tool is positioned in the tool changing position.

8. The method of operating the tool transfer device for machine tools according to claim 6, further comprising providing the tool tilting mechanism with a link mechanism for swingably coupling the vertical moving unit with the horizontal moving unit, and disposing guide rails for tilting the vertical moving unit by horizontal movement of the horizontal moving unit so that the next-process tool can be positioned in the tool changing position.

9. The method of operating the tool transfer device for machine tools according to claim 6, further comprising providing the transfer pot with an upper portion and a lower portion which are vertically movable relative to each other, and gripping the tool by the upper portion and the lower portion of the transfer pot.

10. The method of operating the tool transfer device for machine tools according to claim 6, further comprising providing the tool magazine with a vertical path and a horizontal path for transferring tools and providing the horizontal path near a vertical center of the tool magazine.

* * * * *